(12) United States Patent
Luo et al.

(10) Patent No.: US 12,053,746 B2
(45) Date of Patent: Aug. 6, 2024

(54) HIGH-GRAVITY DEVICE FOR GENERATING NANO/MICRON BUBBLES AND REACTION SYSTEM

(71) Applicant: BEIJING UNIVERSITY OF CHEMICAL TECHNOLOGY, Beijing (CN)

(72) Inventors: Yong Luo, Beijing (CN); Di Wang, Beijing (CN); Guangwen Chu, Beijing (CN); Yachao Liu, Beijing (CN); Zhihao Li, Beijing (CN); Yong Cai, Beijing (CN); Haikui Zou, Beijing (CN); Baochang Sun, Beijing (CN); Jianfeng Chen, Beijing (CN)

(73) Assignee: BEIJING UNIVERSITY OF CHEMICAL TECHNOLOGY, Beijing (CN)

( * ) Notice: Subject to any disclaimer, the term of this patent is extended or adjusted under 35 U.S.C. 154(b) by 155 days.

(21) Appl. No.: 17/418,578

(22) PCT Filed: Mar. 5, 2020

(86) PCT No.: PCT/CN2020/078083
§ 371 (c)(1),
(2) Date: Jun. 25, 2021

(87) PCT Pub. No.: WO2020/177753
PCT Pub. Date: Sep. 10, 2020

(65) Prior Publication Data
US 2022/0062832 A1    Mar. 3, 2022

(30) Foreign Application Priority Data
Mar. 5, 2019 (CN) .......................... 201910163989.0

(51) Int. Cl.
*B01F 23/233* (2022.01)
*B01F 23/2375* (2022.01)
(Continued)

(52) U.S. Cl.
CPC ...... *B01F 23/2331* (2022.01); *B01F 23/2375* (2022.01); *B01F 27/81* (2022.01);
(Continued)

(58) Field of Classification Search
CPC ............ B01F 23/2331; B01F 23/23311; B01F 23/23314; B01F 27/81; B01F 2101/2204; B01F 2215/0431; B01J 7/02
(Continued)

(56) References Cited

U.S. PATENT DOCUMENTS 704,034 A * 7/1902 Head et al. ......... B01F 23/2331
                                                  261/87
2,733,056 A * 1/1956 Marky ................ B01F 23/2332
                                                  261/87
(Continued)

FOREIGN PATENT DOCUMENTS

CN     203598823 U    5/2014
CN     105347519 A    2/2016
(Continued)

OTHER PUBLICATIONS

International Search Report for International Application No. PCT/CN2020/078083; Mail Date of May 28, 2020.
(Continued)

*Primary Examiner* — Charles S Bushey
(74) *Attorney, Agent, or Firm* — CANTOR COLBURN LLP

(57) ABSTRACT

The present application provides a high-gravity device for generating nano/micron bubble and a reaction system. In the device, the liquid phase is continuous phase and the gas
(Continued)

phase is dispersed phase. A gas enters the interior of the device from a hollow shaft, and the gas is subjected to primary shearing under a shearing effect of aerating micropores to form bubbles; then, the bubbles rapidly disengage from the surface of a rotating shaft under the effect of the rotating shaft rotating at a high speed, and are subjected to secondary shearing under the high-gravity environment with the strong shearing force formed by the rotating shaft to form nano/micron bubbles. The device has the advantages of fastness, stability, and small average particle size. The average particle size of the formed nano/micron bubbles is between 800 nanometers and 50 microns, and the average particle size of the bubbles can be regulated in a range by adjusting the rotating speed of the rotating shaft.

8 Claims, 5 Drawing Sheets

(51) Int. Cl.
*B01F 27/81* (2022.01)
*B01J 7/02* (2006.01)
*B01F 101/00* (2022.01)

(52) U.S. Cl.
CPC ........... *B01J 7/02* (2013.01); *B01F 23/23314* (2022.01); *B01F 2101/2204* (2022.01); *B01F 2215/0431* (2013.01)

(58) Field of Classification Search
USPC ..................................................... 261/87, 93
See application file for complete search history.

(56) References Cited

U.S. PATENT DOCUMENTS

| | | | | |
|---|---|---|---|---|
| 4,749,473 A | * | 6/1988 | Shioiri | B03D 1/245 261/87 |
| 5,336,399 A | * | 8/1994 | Kajisono | B01F 23/2331 210/221.1 |
| 6,168,307 B1 | * | 1/2001 | Venas | B01F 23/2331 261/87 |
| 6,461,500 B1 | * | 10/2002 | Hoage | B01F 23/2331 210/150 |
| 8,366,312 B1 | * | 2/2013 | Valdez | B01F 33/403 261/87 |
| 8,632,058 B2 | * | 1/2014 | Nakashima | B01F 23/23124 261/87 |
| 10,591,231 B2 | * | 3/2020 | Russell | B01F 25/313311 |
| 2002/0081254 A1 | | 6/2002 | Boger | |
| 2008/0083997 A1 | * | 4/2008 | Wu | A61H 33/027 261/93 |
| 2011/0269989 A1 | * | 11/2011 | Hassan | C07C 303/06 570/252 |

FOREIGN PATENT DOCUMENTS

| | | | |
|---|---|---|---|
| CN | 107540555 A | | 1/2018 |
| CN | 108778475 A | | 11/2018 |
| CN | 109701457 A | | 5/2019 |
| JP | 2014004542 A | | 1/2014 |
| WO | WO 97/24291 | * | 7/1997 |

OTHER PUBLICATIONS

S. Cao et al., "Mass Transfer Study of Dehydration by Triethylene Glycol in Rotating Packed Bed for Natural Gas Processing"; ACS Publications , Ind. Eng. Chem. Res. 2018, 57, pp. 5394-5400.

G. Chu et al. "Removal of SO2 with Sodium Sulfite Solution in a Rotating Packed Bed"; ACS Publications; Ind. Eng. Chem. Res. 2018, 57, pp. 2329-2335.

Y. Luo et al, "Gas-Liquid Effective Interfacial Area in a Rotating Packed Bed"; ACS Publications; Ind. Eng. Chem. Res. 2012, 51, pp. 16320-16325.

Q.Chen et al. "Polytetrafluoroethylene Wire Mesh Packing in a Rotating Packed Bed: Mass-Transfer Studies"; ACS Publications, Ind. Eng. Chem. Res., 2016, 55, pp. 11606-11613.

* cited by examiner

HIGH-GRAVITY DEVICE FOR GENERATING NANO/MICRON BUBBLES AND REACTION SYSTEM

CROSS REFERENCE TO RELATED APPLICATIONS

This is the U.S. national stage of application No. PCT/CN2020/078083, filed on Mar. 5, 2020. Priority under 35 U.S.C. § 119(a) and 35 U.S.C. § 365(b) is claimed from Chinese Application No. 201910163989.0, filed Mar. 5, 2019, the disclosure of which is also incorporated herein by reference.

TECHNICAL FIELD

The present application relates to the technical field of reactors, in particular to a high-gravity device for generating nano/micron bubbles and a reaction system.

BACKGROUND

Currently, methods for generating nano/micron bubbles mainly include a dissolved air release method and a gas dispersion method. A representative device for the dissolved air release method generally consists of a pump, a dissolved gas vessel, and a nozzle, where a gas is forcibly dissolved in a liquid by means of pressurization to form a supersaturated state, and then the gas is released again by decompressing and generate a large amount of micron bubbles. However, the dissolved air release method has a disadvantage that the process of generating micron bubbles is cumbersome and discontinuous which is difficult to be applied to actual industrial production. The gas dispersion method is a method of dispersing gas into liquid by means of swirling flow at high speed, narrowing gradually and sudden-expansion of flow cross-section, dispersion of microporous etc. to quickly and massively form nano/micron bubbles. In industrial production, dispersion of microporous is the most common means, where nano/micron bubbles are mainly generated by means of a micromixer or using microporous structures made of some microporous media (which are obtained by sintering a mixture of a material such as metallurgical powder, ceramic, or plastic and an appropriate adhesive at high temperature.) However, the nano/micron bubbles formed by such means usually are prone to coalesce on the surface of the microporous medium and form larger bubbles, reducing the gas-liquid contact area between the bubbles and the liquid, and thereby limiting the implementation of excellent functions of the nano/micron bubbles in many fields.

BRIEF SUMMARY

In order to solve at least one of the above problems, the first aspect of the present application provides a high-gravity device for generating nano/micron bubbles, comprising:
 a housing provided with a liquid inlet and a liquid outlet; and
 a high-gravity unit for generating bubbles disposed in the housing; wherein:
 the high-gravity unit for generating bubbles comprises:
 a rotor disposed in the housing, whereby a high-gravity field can be formed by means of rotation of the rotor. The centrifugal acceleration generated by the high-gravity field is greater than 10 g; and
 a hollow shaft having one end bonded to the rotor, the other end of the hollow shaft being in communication with a gas inlet; and
 wherein the hollow shaft divides the housing into an inner cavity and an outer cavity which are in communication with each other, and a number of micron-scale pore canals are provided on the side wall of the hollow shaft.

In some embodiments, the high-gravity device for generating nano/micron bubbles further comprises:
 a gap provided between the housing and the hollow shaft, which is 0.1-10 mm In some embodiments, pore centers of two adjacent pore canals are spaced from each other at a determined distance.

In some embodiments, the pore canals comprise a first pore canal on an upper half portion of the side wall of the hollow shaft and a second pore canal on a lower half portion of the side wall of the hollow shaft; and
 the diameter of the first pore canal is larger than, smaller than, or equal to the diameter of the second pore canal.

In some embodiments, the diameter of the pore canal increases or decreases along the direction of gas flow; or
 the diameter of the pore canal increases or decreases along the direction of liquid flow in the outer cavity.

In some embodiments, the pore canals are symmetrically arranged around the axle center of the hollow shaft.

In some embodiments, the material of the hollow shaft is stainless steel or a titanium-based material, and preferably, the diameter of the pore canal is in the range of 0.01-0.1 mm In some embodiments, the hollow shaft is made of a ceramic membrane, and preferably, the diameter of an pore canal of membrane in inner wall of the ceramic membrane is in the range of 2-48 nm and the diameter of an pore canal of membrane in outer wall is in the range of 5-48 nm.

The second aspect of the present application provides a reaction system, wherein the reaction system is used for a gas-liquid two-phase reaction, and the reaction system comprises a high-gravity device for generating nano/micron bubbles.

The third aspect of the present application provides a reaction system, wherein the reaction system is used for a gas-liquid-solid three-phase reaction or used for a gas-liquid-solid reaction in pseudo-homogeneous phase, the reaction system comprises a reactor and a high-gravity device for generating nano/micron bubbles which are in communication with each other, the high-gravity device for generating nano/micron bubbles mixes a gas reactant and a liquid reactant to form a gas-liquid mixture with nano/micron bubbles, and a solid reactant or solid catalyst can be fed into the reactor.

The Present Application has the Following Beneficial Effects:

The present application provides a high-gravity device for generating nano/micron bubbles and a reaction system. In the device, the liquid phase is continuous phase and the gas phase is dispersed phase. A gas enters the interior of the device from a hollow shaft, and the gas is subjected to primary shearing under a shearing effect of aerating micropores to form bubbles; then, the bubbles rapidly disengage from the surface of a rotating shaft under the effect of the rotating shaft rotating at a high speed, and are subjected to secondary shearing under the high-gravity environment with the strong shearing force formed by the rotating shaft to form nano/micron bubbles. The device has the advantages of fastness, stability, and small average particle size. The average particle size of the formed nano/micron bubbles is between 800 nanometers and 50 microns, and the average particle size of the bubbles can be regulated in a range by adjusting the rotating speed of the rotating shaft. The device, on the one hand, overcomes the problem of a discontinuous liquid phase in a conventional high-gravity device which leads to the inability to form a liquid phase containing nano/micron bubbles, and on the other hand, overcomes the problem of coalescence of nano/micron bubbles on the surface of a static microporous medium. In addition, due to the existence of nano/micron bubbles, the high-gravity device for generating nano/micron bubbles applied to the field such as hydrogenation/oxidation reaction increase the contact area between gas and liquid in a hydrogenation/oxidation reaction process and the gas hold-up of a solution for reaction, thereby enhancing gas-liquid mass transfer, achieving the targets of increasing a global-reaction rate and shortening a reaction time, and having important significance of industrial application in the fields such as petrochemical engineering, fine chemical engineering, coal chemical engineering, and biochemical engineering.

BRIEF DESCRIPTION OF THE DRAWINGS

The specific implementations of the present application are described in further details below with reference to the drawings.

DETAILED DESCRIPTION OF THE PREFERRED EMBODIMENTS

Figure 1:
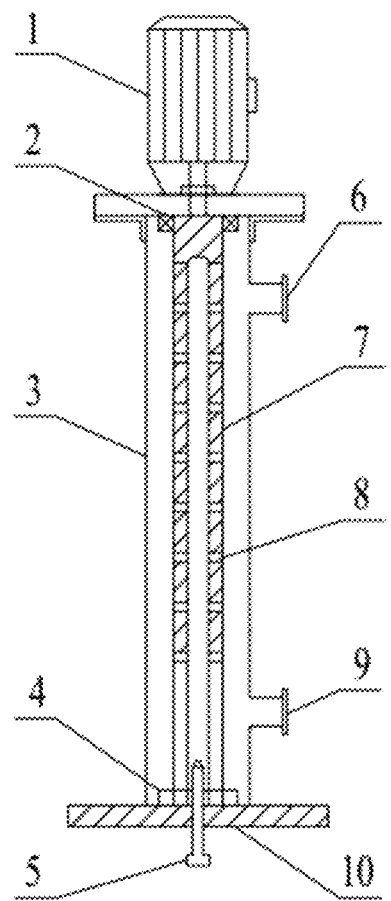
FIG. 1 illustrates a schematic structural diagram of a high-gravity device for generating nano/micron bubbles in an embodiment of the present application.

In order to describe the present application more clearly, the present application will be further described below in combination with some preferred embodiments and drawings. Similar components in the drawings are denoted by the same reference numeral. A person skilled in the art should understand that the content described below is merely for illustrative instead of restrictive, and the protection scope of the present application should not be limited thereto.

The drawings illustrate various sectional views according to the disclosed embodiments of the present application. The drawings are not drawn to scale, some details are enlarged and some details may be omitted for clarity of expression. The shapes of various regions and layers as well as the relative size and positional relationship between them shown in the drawings are only exemplary. In practice, there may be deviations due to manufacturing tolerances or technical limitations, and a person in the art may additionally design areas/layers with different shapes, sizes, and relative positions according to actual needs.

In industrial production, dispersion of microporous is the most common means, where nano/micron bubbles are mainly generated by means of a micromixer or using microporous structures made of some microporous media (which are obtained by sintering a mixture of a material such as metallurgical powder, ceramic, or plastic and an appropriate adhesive at high temperature). However, the nano/micron bubbles formed by such means usually are prone to coalesce on the surface of the microporous medium and form larger bubbles, reducing the gas-liquid contact area between the bubbles and the liquid, and thereby limiting the implementation of excellent functions of the nano/micron bubbles in many fields.

To this end, the first aspect of the present application provides a high-gravity device for generating nano/micron bubbles. A conventional high-gravity reactor is modified, wherein a hollow shaft is fixed on a rotor of the high-gravity reactor, so that the hollow shaft is driven by the rotor to rotate, a gas enters the interior of the device from the hollow shaft, the gas is subjected to primary shearing under a shearing effect of aerating micropores to form bubbles, and then, the bubbles rapidly disengage from the surface of a rotating shaft under the effect of the rotating shaft rotating at a high speed, and are subjected to secondary shearing under the high-gravity environment with the strong shearing force formed by the rotating shaft to form nano/micron bubbles.

A person skilled in the art well knows that a centrifugal acceleration generated by a high-gravity field should be larger than 10 g (i.e., more than 10 times larger than the acceleration of gravity), and details are not described herein.

A person skilled in the art should know that "nano/micron" in the present application refers to a nano/micron scale, that is, the size is in the range of nanometers and micrometers, i.e., between 1 nm-100 um.

It should be noted that the high-gravity device for generating nano/micron bubbles in the present application can be a vertical type device or horizontal type device, e.g., a vertical-type tubular device or vertical-type cylindrical device, which is not limited in the present application, and it is understood that, in the vertical type device, a gas inlet can be disposed below the housing, so that the device is more applicable to a gas that is "lighter" than air due to a push force of gas diffusion.

Taking the vertical type device as an example, as shown in FIG. 1, the high-gravity device for generating nano/micron bubbles includes: a housing 3 provided with a liquid inlet 9 and a liquid outlet 6; and a high-gravity unit for generating bubbles disposed in the housing 3. The high-gravity unit for generating bubbles includes: a rotor disposed in the housing, whereby a high-gravity field can be formed by means of rotation of the rotor, The centrifugal acceleration generated by the high-gravity field is greater than 10 g; and a hollow shaft 7 having one end bonded to the rotor, the other end of the hollow shaft 7 being in communication with a gas inlet 5. The hollow shaft divides the housing into an inner cavity and an outer cavity which are in communication with each other, and a number of micron-scale pore canals 8 are provided on the side wall of the hollow shaft.

The first aspect of the present application provides the high-gravity device for generating nano/micron bubbles. In the device, the liquid phase is continuous phase and the gas phase is dispersed phase. A gas enters the interior of the device from a hollow shaft, and the gas is subjected to primary shearing under a shearing effect of aerating micropores to form bubbles; then, the bubbles rapidly disengage from the surface of a rotating shaft under the effect of the rotating shaft rotating at a high speed, and are subjected to secondary shearing under the high-gravity environment with the strong shearing force formed by the rotating shaft to form nano/micron bubbles. The device has the advantages of fastness, stability, and small average particle size. The average particle size of the formed nano/micron bubbles is between 800 nanometers and 50 microns, and the average particle size of the bubbles can be regulated in a range by adjusting the rotating speed of the rotating shaft. The device, on the one hand, overcomes the problem of a discontinuous liquid phase in a conventional high-gravity device which leads to the inability to form a liquid phase containing nano/micron bubbles, and on the other hand, overcomes the problem of coalescence of nano/micron bubbles on the surface of a static microporous medium.

In a specific implementation, the device further includes a seal 2 for preventing gas and liquid leakage and a flange 10 for fixing the device; and the hollow shaft is cylindrical and has an upper end in connection to a motor in a transmission way and a lower end connected to a bearing 4 in inner bottom of the housing, the lower end is provided with an opening in communication with the gas inlet 5.

During operation of the high-gravity device for generating nano/micron bubbles, the gas discharged from the hollow shaft is subjected to primary shearing by means of an effect of micron-sized aerating micropores (i.e., pore canals) to form micron-sized bubbles, and then the bubbles rapidly disengage from the surface of the wall under the effect of a centrifugal force of the high-speed rotating shaft, thereby avoiding the problem of coalescence of bubbles. Meanwhile, the high-speed rotating shaft forms a strong shearing force and turbulence with the liquid and forms a local vortex, and the generated micron-sized bubbles are continuously sheared under the effect of the shearing force, to form a large number of stable nano/micron bubbles.

In some embodiments, functions of the liquid inlet and the liquid outlet can be exchanged, depending on specific needs. For example, if the liquid is required to flow from top to bottom in the figure, the numeral 6 in the figure represents the liquid inlet and the numeral 9 represents the liquid outlet. The present application is not limited thereto.

In some embodiments, the rotor includes a rotating shaft (not shown in the figure), and the rotating shaft is driven by the motor 1 to rotate at a high speed. The power of the motor 1 can be adjusted as needed, thereby adjusting the rotate speed of the rotor.

In some specific embodiments, the rotate speed of the rotor could be 100-10000 rpm, for example, the rotate speed of the rotor could be 4000 rpm, 5000 rpm, 6000 rpm, 7000 rpm, 8000 rpm, 9000 rpm, or 10000 rpm.

The high-gravity device for generating nano/micron bubbles is characterized in that the gas enters the hollow shaft from an air inlet, the gas is subjected to primary shearing under the effect of the micropores on the wall of the hollow shaft to form small bubbles, and then the small bubbles rapidly disengage from the wall of the rotating shaft under the effect of the rotating shaft rotating at a high speed and are subjected to secondary shearing under a strong shearing force and eddy current generated by the rotating shaft rotating at a high speed, to form a large number of stable nano/micron bubbles.

In some specific embodiments, the size of the nano/micron bubbles can be controlled by regulating the rotate speed of the rotor, for example, a higher rotate speed of the rotor corresponds to smaller size of the bubbles.

Preferably, the height-to-diameter ratio of the housing is 5-30, which can elongate flow path of gas, thereby expanding the range of generation of bubbles.

In some preferred embodiments, a gas flow control valve is disposed at the gas inlet of the housing, so that mixing ratio between gas and liquid can be controlled by controlling a flow rate of gas. Certainly, whether the gas flow control valve is disposed on the housing is not limited in the present application, for example, the gas flow control valve can be disposed on a gas source (generally, each gas cylinder is provided with a gas flow control valve). However, in a system with a relatively long pipeline, there is a relatively large error in controlling the gas flow at a gas source, while there is a relatively small error in directly controlling the gas flow at a gas inlet, thereby eliminating the influence of a pressure difference of the pipeline.

Generally, the material of the hollow shaft can be one of stainless steel, a titanium-based material, or a ceramic membrane material. Certainly, the material of the hollow shaft actually is not limited to the materials mentioned above, and is not listed in the present application.

In some specific preferred embodiments, the material of the hollow shaft is stainless steel or a titanium-based material, and the diameter of the pore canal is in the range of 0.01-0.1 mm In some other specific preferred embodiments, the hollow shaft is made of a ceramic membrane, the diameter of an pore canal of membrane in inner wall of the ceramic membrane is in the range of 2-48 nm, and the diameter of an pore canal of membrane in outer wall is in the range of 5-48 nm, for example, the diameter of pore canal of membrane in inner wall can be 2 nm, 5 nm, 10 nm, 20 nm, or 48 nm, the diameter of pore canal of membrane in outer wall can be 5 nm, 10 nm, 20 nm, or 48 nm, and the above diameters of pore canal of membrane in inner wall and diameters of pore canal of membrane in outer wall can be paired randomly. Preferably, the diameter of pore canal of membrane in inner wall is 20 nm, and the diameter of pore canal of membrane in outer wall is 5 nm.

Generally, the wall thickness of the hollow shaft is 2-10 mm, and preferably, the wall thickness of the hollow shaft is 3 mm The hollow shaft is described in detail below with reference to FIG. 2A and FIG. 2B.

Figure 2A:
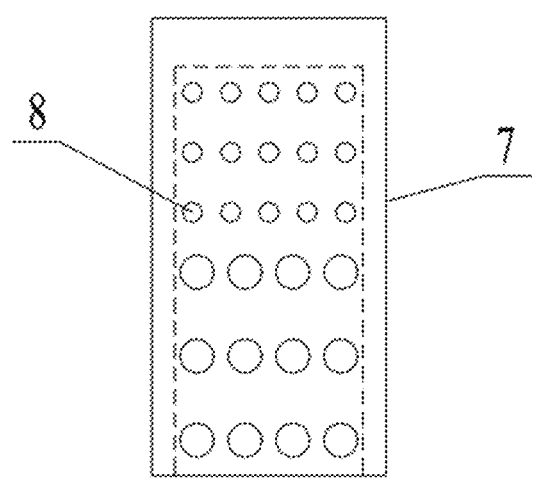
FIG. 2A illustrates a schematic diagram of a pore canal arrangement on a hollow shaft in FIG. 1 in an embodiment of the present application.
Figure 2B:
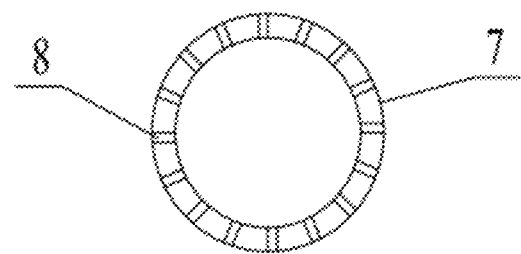
FIG. 2B illustrates a vertical view of the hollow shaft in FIG. 1 in an embodiment of the present application.

FIG. 2B illustrates a vertical view of the hollow shaft. It can be seen that from FIG. 2B that, on the one hand, the pore canals are arranged symmetrically around the axle center of the hollow shaft, and on the other hand, on a horizontal section of the hollow shaft, pore centers (i.e., the center of the pore canal) of any two adjacent pore canals are evenly spaced from each other at a same distance.

The diameters of all the pore canals can be the same or different, which can be adjusted according to the situation. Generally, the pore canals include a first pore canal on an upper half portion of the side wall of the hollow shaft and a second pore canal on a lower half portion of the side wall of the hollow shaft; and the diameter of the first pore canal is larger than, smaller than, or equal to the diameter of the second pore canal.

For example, in an embodiment, the high-gravity device for generating nano/micron bubbles is a vertical-type cylindrical device, the liquid inlet is disposed below the housing, the liquid outlet is disposed above the housing, and the gas inlet is disposed at the bottom below the housing. Since the gas inlet is disposed below the housing, in the entire inner cavity, the density of lower gas is relatively large, an driving force of overflow is relatively large, and overflow is easier to occur at the same diameter of pore canal; the density of upper gas is relatively small, an driving force of overflow is relatively small, and overflow is more difficult to occur at the diameter of same pore canal. In this case, the diameter of the first pore canal is configured to be larger than the diameter of the second pore canal, to balance overflow amounts of both pore canals, thereby avoiding the phenomenon in which bubble densities on the upper portion and bubble densities on the lower portion are different.

For another example, in an embodiment, the liquid outlet is disposed above the housing, and the gas inlet is disposed at the bottom below the housing. Since the gas inlet is disposed below the housing, in a mixing system with a relatively fast flow rate of liquid, the liquid in a liquid inlet area applies an impact force to the hollow shaft, preventing the bubbles from being thrown out; in a liquid outlet area, flow of liquid have a driving effect on the bubbles, accelerating throw-out of the bubbles. In this system, the diameter of the second pore canal can be slightly greater than the diameter of the first pore canal, to balance the influences of inlet liquid flow and outlet liquid flow.

Certainly, in some optional embodiments, regardless of the influence of the system, the diameter of the first pore canal is as same as the diameter of the second pore canal.

Optionally, in an preferred embodiment, since the entire flow system has a gradient law (for example, the flow rate at the liquid inlet-the liquid outlet continuously decreases, and the gas density near the gas inlet-far away from the gas inlet continuously decreases), the diameter of the pore canal increases or decreases along the direction of gas flow; or, the diameter of the pore canal increases or decreases along the direction of liquid flow in the outer cavity. In this way, regulation can be performed according to the entire flow system, to make the size of the pore canal more compatible with the specific system.

For example, the diameter of the pore canal continuously decreases along the direction from bottom to top in FIG. 2A. By configuring the decreasing diameters of the pore canal, for example, the diameters of two vertically adjacent pore canals differ by 0.1 mm, 0.2 mm, etc., the influence of a difference between upper and lower gas concentrations can be alleviated, or a liquid flow rate difference can be balanced (there is resistance and gravity in a flow process, resulting in a slight difference in the flow rate), and the diameter of pore canal increases continuously.

In addition, it can be seen from FIG. 2A that in the axial direction of the hollow shaft, pore centers of two adjacent pore canals are spaced from each other at a same distance which is determined distance (i.e., a given distance data, such as 10 mm, 20 mm, etc.).

In some embodiments, the average particle size of the formed nano/micron bubbles is between 800 nanometers and 50 micrometers and can be specifically measured by means of visualization, X-ray imaging techniques, and optical fiber probes or conductivity probes, and the present application is not limited thereto.

It can be seen from the above embodiments that, the present application provides a high-gravity device for generating nano/micron bubbles and a reaction system. In the device, the liquid phase is continuous phase and the gas phase is dispersed phase. A gas enters the interior of the device from a hollow shaft, and the gas is subjected to primary shearing under a shearing effect of aerating micropores to form bubbles; then, the bubbles rapidly disengage from the surface of a rotating shaft under the effect of the rotating shaft rotating at a high speed, and are subjected to secondary shearing under high-gravity environment with the strong shearing force formed by the rotating shaft to form nano/micron bubbles. The device has the advantages of fastness, stability, and small average particle size. The average particle size of the formed nano/micron bubbles is between 800 nanometers and 50 microns, and the average particle size of the bubbles can be regulated in a range by adjusting the rotating speed of the rotating shaft. The device, on the one hand, overcomes the problem of a discontinuous liquid phase in a conventional high-gravity device which leads to the inability to form a liquid phase containing nano/micron bubbles, and on the other hand, overcomes the problem of coalescence of nano/micron bubbles on the surface of a static microporous medium.

Based on the inventive concept of the high-gravity device for generating nano/micron bubbles provided in the first aspect of the present application, a second aspect of the present application provides a reaction system. The reaction system is used for a gas-liquid two-phase reaction, and the reaction system includes a high-gravity device for generating nano/micron bubbles.

Figure 3A:
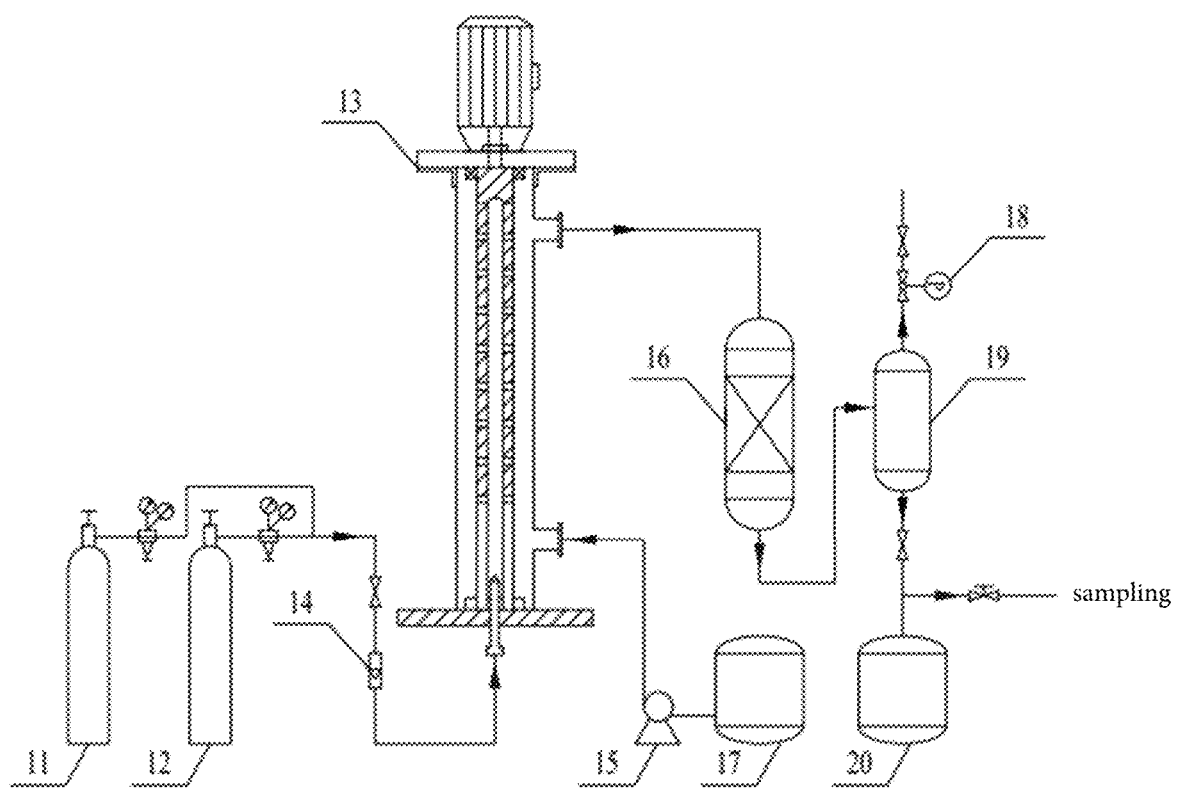
FIG. 3A illustrates a first structural schematic diagram of a reaction system in an embodiment of the present application.
Figure 3B:
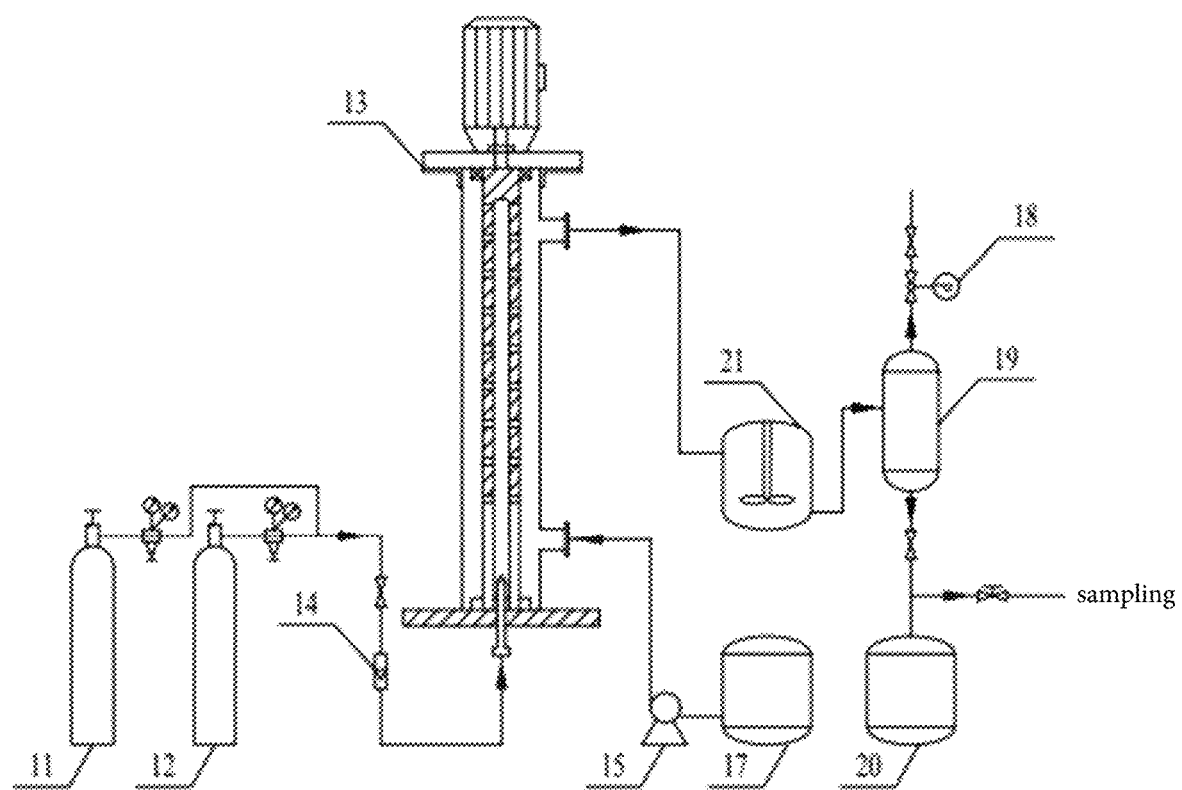
FIG. 3B illustrates a second structural schematic diagram of a reaction system in an embodiment of the present application.
Figure 3C:
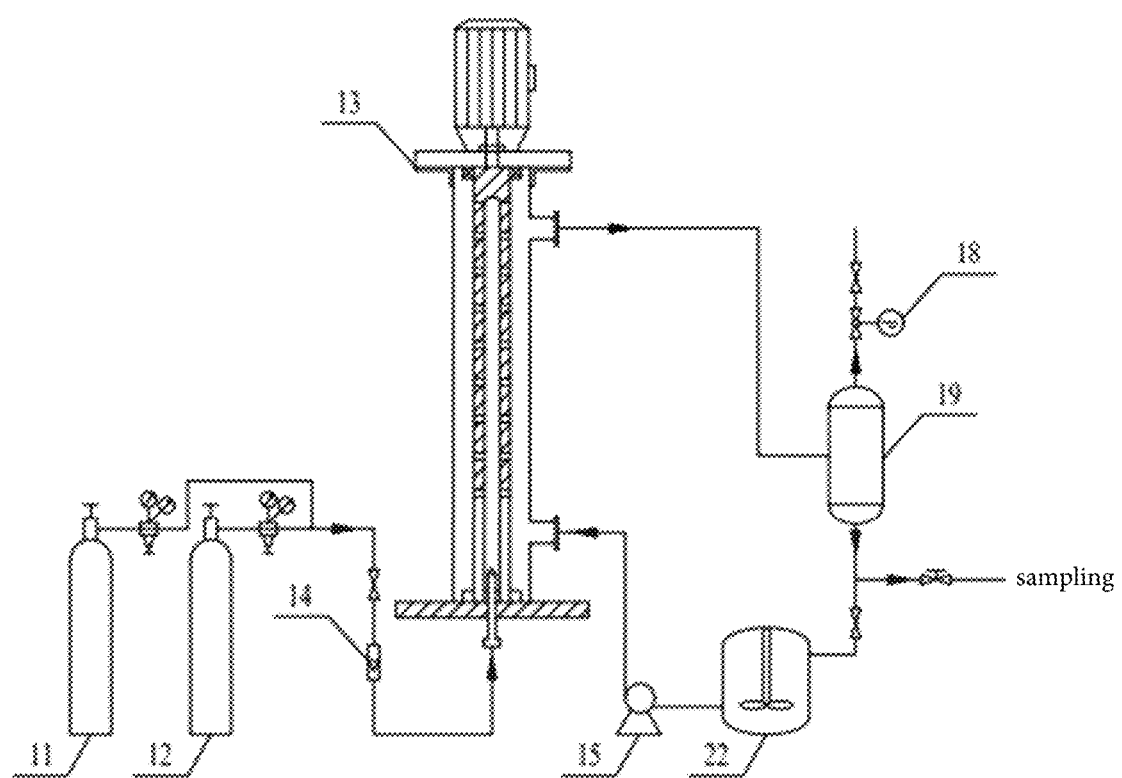
FIG. 3C illustrates a third structural schematic diagram of a reaction system in an embodiment of the present application.

In a specific embodiment, the use of the high-gravity device for generating nano/micron bubbles in the system as a reactor for a gas-liquid two-phase oxidation reaction includes the following steps:

1) a stirred tank 22 is connected to a liquid inlet of the high-gravity device for generating nano/micron bubbles 13, and a gas-liquid separator 19 is connected to a liquid outlet of the high-gravity device for generating nano/micron bubbles 13 (as shown in FIG. 3C);

2) a piston pump is started, a reaction solution enters the high-gravity device for generating nano/micron bubbles 13 and form liquid phase circulation, and after the system is stabilized, a gas cylinder is opened and oxygen is fed thereinto to perform a gas-liquid two-phase oxidation reaction, wherein the pressure in the reaction system is controlled by a counter balance valve 17 and the temperature is controlled by a temperature control system; and 3) a gas-liquid mixture containing a reaction product produced in step 2) is subjected to separating by means of the gas-liquid separator 19, wherein a gas is discharged from a vent valve, a liquid flows into an intermediate stirred tank 21; by controlling a ball valve 22 to be switched on or off, the system can be controlled to be a single-pass oxidation reaction or a cyclic oxidation reaction; when the ball valve 22 is switched on, the system is a cyclic oxidation reaction, and when the ball valve is switched off, the system is a single-pass oxidation reaction; and a sample obtained after the reaction is subjected to further detection after separation.

The gas-liquid-solid three-phase reaction system provided in this aspect is described in detail below in combination with specific scenarios.

Hydrogenation reaction using the gas-liquid two-phase reaction system provided in this aspect.

Referring to FIG. 3A, the device shown in FIG. 1 is applied to a hydrogenation reaction in a fixed bed reactor, including a nitrogen cylinder 11, a hydrogen cylinder 12, a high-gravity device for generating nano/micron bubbles 13, a gas mass flow meter 14, a piston pump 15, a fixed bed reactor 16, a raw material tank 17, a counter balance valve 18, a gas-liquid separator 19, and a sample storage tank 20. The high-gravity device for generating nano/micron bubbles, the raw material tank, and the fixed bed reactor each are provided with an electric heating. A reaction process includes steps of: opening the nitrogen cylinder, and purging the entire pipeline to discharge air; switching on a heating device, opening the hydrogen cylinder after the heating device reaches a predetermined temperature, regulating gas flow by using the gas mass flow meter, and regulating the pressure to a preset pressure by using the counter balance valve; starting the high-gravity device for generating nano/micron bubbles, and adjusting a rotate speed; starting the piston pump, filling the entire high-gravity device for generating nano/micron bubbles with a reaction solution, then regulating liquid flow by using the piston pump to control a time for the reaction solution to pass through the fixed bed reactor, and taking a sample from a sampling connection for analysis after the system is stabilized.

For example, in an hydrogenation reaction of anthraquinone: the fixed bed reactor is filled with a Pd/Al2O3 catalyst with an equivalent diameter of 1.6 mm, hydrogen is fed into the reactor at 90° C. for pre-reduction before use, and then sealing is performed using nitrogen; a mixture of mesitylene and trioctyl phosphate at a volume ratio of 3:1 is used as a mixed solvent to prepare a 2-ethylanthraquinone working solution with a concentration of 120 (g/L), At a condition where the temperature is 50° C., the pressure is 0.3 MPa, and a rotate speed of the high-gravity device for generating nano/micron bubbles is 2000 rpm, a mixed fluid containing nano/micron bubbles (with an average diameter of bubble of 10 microns) is fed into the fixed bed reactor, and after 35 s, the conversion rate of anthraquinone can reach 35%, the selectivity is 92%, and the hydrogenation efficiency is 5.8 (g/L); At a condition where the temperature and pressure are same as the those described above and only the rotate speed of the high-gravity device for generating nano/micron bubbles is changed to 2700 rpm, a mixed fluid containing nano/micron bubbles (with an average diameter of bubble of 900 nanometers) is fed into the fixed bed reactor, and after 35 s, the conversion rate of anthraquinone can reach 48%, the selectivity is 93.5%, and the hydrogenation efficiency is 6.5 (g/L).

It can be seen from the above results that the high-gravity device for generating nano/micron bubbles has a good catalytic hydrogenation effect on the hydrogenation reaction of anthraquinone in the fixed-bed; furthermore, within a specific range, with the increase of the rotate speed of the rotating shaft in high-gravity device for generating nano/micron bubbles, the average particle size of the nano/micron bubbles generated by the device tends to decrease, and the decrease of the average particle size of the bubbles leads to an increase of a contact area between gas and liquid and the gas hold-up, thereby facilitating the improvement in the effect on the hydrogenation reaction of anthraquinone in the fixed-bed.

Hydrogenation reaction using the gas-liquid two-phase reaction system in the case where the high-gravity device for generating nano/micron bubbles does not rotate Experimental devices and experimental processes as same as those in the above scenario are adopted. A mixture of mesitylene and trioctyl phosphate at a volume ratio of 3:1 is used as a mixed solvent to prepare a 2-ethylanthraquinone working solution with a concentration of 120 (g/L), At a condition where the temperature is 50° C., the pressure is 0.3 MPa, and the high-gravity device for generating nano/micron bubbles does not rotate, the gas is subjected to shearing only by means of the effect of aerating micropores on the wall of the hollow shaft to form a gas-liquid mixed fluid, the gas-liquid mixed fluid containing micron bubbles (with an average diameter of bubble of 550 micron) is fed into the fixed bed reactor, and after 35 s, the conversion rate of anthraquinone can reach 12%, the selectivity is 96%, and the hydrogenation efficiency is 1.8 (g/L).

From a result of comparison between the two scenarios, it can be seen that, compared with gas shearing alone by static microporous medium, the effect of the shearing force generated by the rotating shaft rotating at a high speed in the high-gravity device for generating nano/micron bubbles can further reduce the average diameter of the formed bubbles , effectively overcoming the problem of coalescence and enlarge of the bubbles on the surface of the static microporous medium, and in addition, the effect of a hydrogenation reaction of anthraquinone in fixed-bed using the device of the present application is better than that of a reaction using the static microporous medium alone.

Oxidation reaction using the gas-liquid two-phase reaction system provided in this aspect Referring to FIG. 3C, the device shown in FIG. 1 is used as a reactor for a gas-liquid two-phase oxidation reaction of anthrahydroquinone. Operation steps are as follows: 2-ethylanthrahydroquinone, which is a hydrogenation product of 2-ethylanthraquinone, is added into the stirred tank 22, with a concentration of 0.43 mol/L, the piston pump is started to circulate a solution in pseudo-homogeneous phase, and after the system is stabilized, a gas cylinder is opened and the high-gravity device for generating nano/micron bubbles is started, wherein cyclic oxidation is performed at 50° C. and normal pressure, and the 2-ethylanthrahydroquinone can be completely oxidized within 5 minutes (the conversion rate is 100%).

It can be seen from the above scenario that in the reaction system provided in the present application, the high-gravity device for generating nano/micron bubbles is applied to the field of gas-liquid hydrogenation/oxidation reaction. Due to the existence of nano/micron bubbles, the contact area between gas and liquid during a hydrogenation/oxidation reaction process is increased, and the gas hold-up of a solution for reaction is increased, thereby enhancing gas-liquid mass transfer, achieving the targets of increasing a global-reaction rate and shortening a reaction time, and having important significance of industrial application in the fields such as petrochemical engineering, fine chemical engineering, coal chemical engineering, and biochemical engineering.

Based on the inventive concept of the high-gravity device for generating nano/micron bubbles provided in the first aspect of the present application, a third aspect of the present application provides a reaction system. The reaction system is used for a gas-liquid-solid three-phase reaction or used for a gas-liquid-solid reaction in pseudo-homogeneous phase, the reaction system includes a reactor and a high-gravity device for generating nano/micron bubbles which are in communication with each other, the high-gravity device for generating nano/micron bubbles mixes a gas reactant and a liquid reactant to form a gas-liquid mixture with nano/micron bubbles, and a solid reactant or solid catalyst can be fed into the reactor.

In a specific embodiment, the use of the high-gravity device for generating nano/micron bubbles in the system for a gas-liquid-solid three-phase hydrogenation/oxidation reaction in a fixed bed reactor includes the following steps:

1) the high-gravity device for generating nano/micron bubbles 13 is connected to an inlet of a fixed bed reactor 16, a gas-liquid separator 19 is connected to an outlet of the fixed bed reactor 16 (as shown in FIG. 3A), and then the high-gravity device for generating nano/micron bubbles is started to form a gas-liquid mixture;

2) the gas-liquid mixture containing nano/micron bubbles produced in step 1) is fed into the fixed bed reactor loaded with particles of catalyst, to perform a hydrogenation/oxidation reaction, wherein the pressure of the reaction system is controlled by a counter balance valve 17 and the temperature is controlled by a temperature control system; and 3) a gas-liquid mixture containing a reaction product produced in step 2) is subjected to separating by means of the gas-liquid separator 19, wherein a gas is discharged from a vent valve, a liquid flows into a sample storage tank 20, and a sample is subjected to further detection after separation.

In a specific embodiment, the use of the high-gravity device for generating nano/micron bubbles in the system for a gas-liquid-solid hydrogenation/oxidation reaction in pseudo-homogeneous phase in a stirred tank reactor includes the following steps:

1) the high-gravity device for generating nano/micron bubbles 13 is connected to an inlet of a stirred tank reactor 22, a gas-liquid separator 19 is connected to an outlet of the stirred tank reactor 21 (as shown in FIG. 3B), and then the high-gravity device for generating nano/micron bubbles is started to form a gas-liquid mixture;

2) the stirred tank reactor is started, the gas-liquid mixture containing nano/micron bubbles produced in step 1) is fed into the stirred tank reactor loaded with nano or micron powder particles of catalyst, to perform a hydrogenation/oxidation reaction, wherein the pressure of the reaction system is controlled by a counter balance valve 17 and the temperature is controlled by a temperature control system; and 3) a gas-liquid mixture containing a reaction product produced in step 2) is subjected to separating by means of the gas-liquid separator 19, wherein a gas is discharged from a vent valve, a liquid flows into a sample storage tank 20, and a sample is subjected to further detection after filtration or centrifugation and separation.

A catalyst of noble metal used in step 2) is a catalyst prepared by means of high-temperature calcination of noble metal such as supported palladium and platinum or mixed metal which solid particles such as alumina and silica, or a molecular sieve used as a carrier.. The particle size of the catalyst ranges from 10 nm to 800 um, wherein an optimal particle size is 50 nm-200 um.

In a specific embodiment, the use of the high-gravity device for generating nano/micron bubbles as a reactor in the system for a gas-liquid-solid hydrogenation/oxidation reaction in pseudo-homogeneous phase includes the following steps:

1) a stirred tank 22 is connected to a liquid inlet of the high-gravity device for generating nano/micron bubbles 13, and a gas-liquid separator 19 to is connected to a liquid outlet of the high-gravity device for generating nano/micron bubbles 13 (as shown in FIG. 3C);

2) a solution for reaction and a nano or micron powder catalyst are added into a stirred tank 21, a piston pump is started to form circulation of liquid phase, and after the system is stabilized, a gas cylinder is opened to perform a gas-liquid-solid three-phase hydrogenation/oxidation reaction in pseudo-homogeneous phase, wherein the pressure in the reaction system is controlled by a counter balance valve 17 and the temperature is controlled by a temperature control system; and 3) a gas-liquid mixture containing a reaction product produced in step 2) is subjected to separating by means of the gas-liquid separator 19, wherein a gas is discharged from a vent valve, a liquid flows into an intermediate stirred tank 21; by controlling a ball valve 22 to be switched on or off, the system can be controlled to be a single-pass hydrogenation/oxidation reaction or a cyclic hydrogenation/oxidation reaction; when the ball valve 22 is switched on, the system is a cyclic hydrogenation/oxidation reaction, and when the ball valve is switched off, the system is a single-pass hydrogenation/oxidation reaction; and a sample obtained after the reaction is subjected to further detection after filtration or centrifugation and separation.

In the above specific embodiment, the catalyst may be micron/nano-scale particles, or catalyst particles of noble metal for a hydrogenation reaction. The catalyst particle of noble metal is a catalyst prepared by mean of high-temperature calcination of noble metal such as supported palladium and platinum or mixed metal, which solid particles such as alumina and silica, or a molecular sieve used as a carrier. The particle size of the catalyst ranges from 10 nm to 800 um, wherein an optimal particle size is 50 nm-200 um.

The gas-liquid-solid reaction system in pseudo-homogeneous phase provided in this aspect is described in detail below in combination with specific scenarios.

Hydrogenation reaction using the gas-liquid-solid reaction system in pseudo-homogeneous phase provided in this aspect Referring to FIG. 3B, the device shown in FIG. 1 is used for a gas-liquid-solid hydrogenation reaction of anthraquinone in pseudo-homogeneous phase in a stirred tank reactor. Experimental devices are the same as those of the above gas-liquid two-phase reaction, except for a stirred tank reactor 21, and operation steps are also the same as those of the gas-liquid two-phase reaction. A mixture of mesitylene and trioctyl phosphate at a volume ratio of 1:1 is used as a mixed solvent to prepare a 2-ethylanthraquinone working solution with a concentration of 100 (g/L), hydrogenation is performed at a condition where the temperature is 60° C., the pressure is 0.3 MPa, and the concentration of a Pd/γ-Al2O3 catalyst is 2% wt, and after 11 min, the conversion rate of anthraquinone can reach 76%, the selectivity is 90.5%, and the hydrogenation efficiency is 9.5 (g/L).

The system shown in FIG. 3C can also be used as a gas-liquid-solid 1-nitroanthraquinone hydrogenation reaction system in pseudo-homogeneous phase. The device shown in FIG. 1 is used as a reactor for a gas-liquid-solid 1-nitroanthraquinone hydrogenation reaction in pseudo-homogeneous phase. Operation steps are as follows: a reaction solution is prepared using 1-nitroanthraquinone and N,N-2 methylformamide at a mass ratio of 3:20 and is added into the stirred tank 22 together with the Pd/γ-Al2O3 catalyst with a particle size of 80 microns, the stirred tank is started to completely mix the catalyst and the solution and keep the mixture in a state of suspension; a piston pump is started to circulate the solution in pseudo-homogeneous phase, and after the system is stabilized, a gas cylinder is opened and the high-gravity device for generating nano/micron bubbles is started, to perform cyclic hydrogenation at a condition where the temperature is 100° C., the pressure is 1.2 MPa, and the concentration of catalyst is 4%wt, wherein the purity of a the resultant of reaction 1-aminoanthraquinone can reach above 95% within 40 minutes.

It can be seen that the reaction system provided in this aspect can be used for a gas-liquid-solid three-phase reaction or used for a gas-liquid-solid reaction in pseudo-homogeneous phase. Due to the existence of nano/micron bubbles, the contact area between gas and liquid during a hydrogenation/oxidation reaction process is increased, and the gas hold-up of a solution for reaction is increased, thereby enhancing gas-liquid mass transfer, achieving the targets of increasing a global-reaction rate and shortening a reaction time, and having important significance of industrial application in the fields such as petrochemical engineering, fine chemical engineering, coal chemical engineering, and biochemical engineering.

Certainly, the above-mentioned scenarios are merely illustrative. The device can be applied to various hydrogenation/oxidation reactions, or other hybrid reactions, which are not exhaustively listed herein. It should be understood that a replacement for the reaction system based on the concept of the present application, although not necessarily one of hydrogenation or oxidation, still falls within the scope limited by the present application.

Obviously, the above-mentioned embodiments of the present application are merely examples for clearly describing the present application, but are not intended to limit the implementation of the present application. A person of ordinary skill in the art can also make other variations or changes in different forms on the basis of the above description. All the implementations cannot be exhaustively listed herein, and any obvious variation or change derived from the technical solutions of the present application still falls within the protection scope of the present application.

What is claimed is:

1. A high-gravity device for generating nano/micron bubbles, comprising:
    a housing provided with a liquid inlet and a liquid outlet; and
    a high-gravity unit for generating bubbles disposed in the housing;
    wherein:
    the high-gravity unit for generating bubbles comprises:
        a rotor disposed in the housing, whereby a high-gravity field can be formed by means of rotation of the rotor, the centrifugal acceleration generated by the high-gravity field is greater than 10 g with a radius of the rotor ranging from 41 mm to 212 mm and a rotor speed of the rotor ranging between 100 rpm and 10000 rpm; and
        a hollow shaft having one end bonded to the rotor, the other end of the hollow shaft being in communication with a gas inlet;
    wherein the hollow shaft divides the housing into an inner cavity and an outer cavity which are in communication with each other, and a number of micron-scale pore canals are provided on a side wall of the hollow shaft,
    wherein a gap provided between the housing and the hollow shaft is 0.1-10 mm, and
    wherein the diameter of the pore canal continuously increases along a direction of gas flow parallel to a main extension direction of the hollow shaft or continuously decreases along the direction of the gas flow; or
    the diameter of the pore canal continuously increases along the direction of liquid flow in the outer cavity parallel to the main extension direction of the hollow shaft or continuously decreases along the direction of liquid flow.

2. The high-gravity device for generating nano/micron bubbles according to claim 1, wherein pore centers of two adjacent pore canals are spaced from each other at a determined distance.

3. The high-gravity device for generating nano/micron bubbles according to claim 1, wherein the pore canals comprise a first pore canal on an upper half portion of the side wall of the hollow shaft and a second pore canal on a lower half portion of the side wall of the hollow shaft;
    the upper half portion is disposed above a center portion of the hollow shaft in a main extension direction of hollow shaft and the lower half portion is disposed below the center portion of the hollow shaft in the main extension direction of hollow shaft; and
    the diameter of the first pore canal is larger than, smaller than, or equal to the diameter of the second pore canal.

4. The high-gravity device for generating nano/micron bubbles according to claim 1, wherein the pore canals are symmetrically arranged around the axle center of the hollow shaft.

5. The high-gravity device for generating nano/micron bubbles according to claim 1, wherein the material of the hollow shaft is stainless steel or a titanium- based material, and the diameter of the pore canal is in the range of 0.01-0.1 mm.

6. The high-gravity device for generating nano/micron bubbles according to claim 1, wherein the hollow shaft is made of a ceramic membrane, and, the diameter of a pore canal of membrane in inner wall of the ceramic membrane is in the range of 2-48 nm and the diameter of a pore canal of membrane in outer wall is in the range of 5-48 nm.

7. A reaction system for a gas-liquid two-phase reaction, the reaction system comprising a high-gravity device for generating nano/micron bubbles according to claim 1.

8. A reaction system for a gas-liquid-solid three-phase reaction or for a gas-liquid-solid reaction in pseudo-homogeneous phase, the reaction system comprising:
    a reactor and a high-gravity device for generating nano/micron bubbles according to claim 1 which are in communication with each other, the high-gravity device for generating nano/micron bubbles mixes a gas reactant and a liquid reactant to form a gas-liquid mixture with nano/micron bubbles, and a solid reactant or solid catalyst can be fed into the reactor.

* * * * *